(12) United States Patent
Shin et al.

(10) Patent No.: US 11,611,267 B2
(45) Date of Patent: Mar. 21, 2023

(54) APPARATUS FOR IMPREGNATING VARNISH INTO HAIRPIN WINDING TYPE STATOR

(71) Applicants: Hyundai Motor Company, Seoul (KR); Kia Corporation, Seoul (KR)

(72) Inventors: Jongho Shin, Siheung-si (KR); Seongjun Park, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 51 days.

(21) Appl. No.: 17/330,993

(22) Filed: May 26, 2021

(65) Prior Publication Data

US 2022/0094245 A1 Mar. 24, 2022

(30) Foreign Application Priority Data

Sep. 23, 2020 (KR) .................. 10-2020-0122856

(51) Int. Cl.
*H02K 15/00* (2006.01)
*H02K 15/12* (2006.01)

(52) U.S. Cl.
CPC ......... *H02K 15/0043* (2013.01); *H02K 15/12* (2013.01); *Y10T 29/5313* (2015.01)

(58) Field of Classification Search
CPC ...... H02K 15/12; H02K 3/32; H02K 15/0043; Y10T 29/49009; Y10T 29/49012; Y10T 29/49073; Y10T 29/5313

USPC ............... 29/729, 596, 598, 623.5, 732, 734
See application file for complete search history.

(56) References Cited

U.S. PATENT DOCUMENTS 3,527,662 A * 9/1970 Elsworth ................ H02K 15/12
118/620
2016/0126816 A1 5/2016 Kimura

FOREIGN PATENT DOCUMENTS

| JP | H09322495 A | * 12/1997 |
| KR | 101539437 B1 | 7/2015 |
| KR | 101760594 B1 | 5/2016 |

* cited by examiner

*Primary Examiner* — Thiem D Phan
(74) *Attorney, Agent, or Firm* — McDonnell Boehnen Hulbert & Berghoff LLP

(57) ABSTRACT

An exemplary apparatus for impregnating varnish into stator coils of a hairpin winding type stator includes a supporting frame vertically installed on a base frame, a tilting bracket installed upper end portion of the supporting frame to be capable of tilting, a rotary bracket installed on the tilting bracket to be rotatable along a circumferential direction, core chucking members installed on the rotary bracket, inserted into a plurality of bolt engagement hole provided in the stator core, and fixing the stator core to the rotary bracket, a first varnish application unit movably installed on the base frame, and configured to apply the varnish to interior and exterior sides of a crown portion of the stator coils, and a second varnish application unit movably installed on the base frame, and configured to apply the varnish to interior and exterior sides of the welding portion of the stator coils.

8 Claims, 10 Drawing Sheets

APPARATUS FOR IMPREGNATING VARNISH INTO HAIRPIN WINDING TYPE STATOR

CROSS-REFERENCE TO RELATED APPLICATIONS

This application claims priority to and the benefit of Korean Patent Application No. 10-2020-0122856 filed in the Korean Intellectual Property Office on Sep. 23, 2020, the entire contents of which are incorporated herein by reference.

FIELD

The present disclosure relates to an apparatus for impregnating varnish into hairpin winding type stator.

BACKGROUND

In general, hybrid vehicles or electric vehicles called environment-friendly vehicles employ a technology that generates driving torque by a drive motor. As a part of reducing the weight and volume of vehicle and parts, automakers and environment-friendly part manufacturers are applying a drive motor with a stator wound with a hairpin type stator coil.

These hairpin winding type stators are manufactured through a process of winding hairpin type stator coils to the stator core and welding ends of the stator coils wound to the stator core.

After welding the ends of stator coils, an insulating resin such as epoxy is coated on the welded area.

However, it may cause a defect such as separation of insulating resin from a welded area having weak mechanical strength due to external force and vibration applied to stator coils.

The above information disclosed in this Background section is only for enhancement of understanding of the background of the disclosure, and therefore it may contain information that does not form the prior art that is already known in this country to a person of ordinary skill in the art.

SUMMARY

An exemplary apparatus is for impregnating varnish into stator coils of a hairpin winding type stator after coating epoxy resin on a welding portion of hairpin type stator coils wound around stator core, where the apparatus may include a supporting frame vertically installed on a base frame, a tilting bracket installed upper end portion of the supporting frame to be capable of tilting, a rotary bracket installed on the tilting bracket to be rotatable along a circumferential direction, core chucking members installed on the rotary bracket, inserted into a plurality of bolt engagement hole provided in the stator core, and fixing the stator core to the rotary bracket, a first varnish application unit movably installed on the base frame, and configured to apply the varnish to interior and exterior sides of a crown portion of the stator coils, and a second varnish application unit movably installed on the base frame, and configured to apply the varnish to interior and exterior sides of the welding portion of the stator coils.

The exemplary apparatus may further include a varnish gelling unit installed to be reciprocally movable on the base frame, and configured to heat the varnish coated on the stator coils by the first and second varnish application units.

The exemplary apparatus may further include a first driving portion installed on the supporting frame, and configured to tilt the tilting bracket by an operation of a first servo-motor, and a second driving portion installed on the tilting bracket, and configured to rotate the rotary bracket along the circumferential direction by an operation of a second servo-motor.

The tilting bracket may be provided to be capable of tilting together with the rotary bracket in a range of 0 to 90 degrees with reference to the supporting frame by the first driving portion.

The core chucking members may be inserted into the bolt engagement holes by the handling robot while the stator core is gripped by an arm of a handling robot.

The core chucking member may include a chucking rod having a first end fixed to the rotary bracket, and a second end portion to be inserted into the bolt engagement hole of the stator, and a plurality of non-slip pads each installed in the second end portion of the chucking rod elastically by a spring.

The first varnish application unit may include a first movable member provided to be movably by a third driving portion, a first application nozzle installed on the first movable member, and configured to apply the varnish toward the interior of the crown portion, and a second application nozzle installed on the first movable member, and configured to apply the varnish toward the exterior of the crown portion.

The second varnish application unit may include a second movable member provided to be movably by a fourth driving portion, a third application nozzle installed on the second movable member, and configured to apply the varnish toward the interior of the welding portion, and a fourth application nozzle installed on the second movable member, and configured to apply the varnish toward the exterior of the welding portion.

An apparatus is for impregnating varnish into hairpin type stator coils sound around a stator core of a hairpin winding type stator, where the apparatus may include a supporting frame vertically installed on a base frame, a core mounting unit installed on the upper end portion of the supporting frame, and configured to fixedly hold the stator core, tilt the stator core, and rotate the stator core in the circumferential direction, a first varnish application unit movably installed on the base frame, and configured to apply the varnish to interior and exterior sides of a crown portion of the stator coils, a second varnish application unit movably installed on the base frame, and configured to apply the varnish to interior and exterior sides of the welding portion of the stator coils, and a varnish gelling unit installed to be reciprocally movable on the base frame, and configured to heat the varnish coated on the stator coils by the first and second varnish application units.

The first varnish application unit may include a first movable member provided to be movable by a driving portion, a first application nozzle installed on the first movable member, and configured to apply the varnish toward the interior of the crown portion, and a second application nozzle installed on the first movable member, and configured to apply the varnish toward the exterior of the crown portion.

The second varnish application unit may include a second movable member provided to be movable by a driving portion, a third application nozzle installed on the second movable member, and configured to apply the varnish toward the interior of the welding portion, and a fourth application nozzle installed on the second movable member, and configured to apply the varnish toward the exterior of the welding portion.

The varnish gelling unit may heat the varnish coated on the stator coils to a range of 150° C. to 200° C. thereby gelling the varnish.

The varnish gelling unit may include a movable frame installed to be reciprocally movable on the base frame, a first induction coil fixed to the movable frame, and configured to surround exterior circumference of the stator core and to induction-heat the exterior circumference of the stator core and an exterior of the stator coils, and a second induction coil fixed to the movable frame, and configured to surround the interior circumference of the stator core and to induction-heat the interior circumference of the stator core and an interior of the stator coils.

The first and second induction coils may be fixedly installed on the movable frame through mounting bracket of an insulating material.

In an exemplary embodiment, the varnish may be impregnated into the stator coils and gelled by configuration to secure durability of epoxy coated on the welding portion of the stator coils. Therefore, it is possible to prevent defects such as the peeling of the epoxy from the welding portion of the stator coils where the mechanical strength is weak, due to external force and vibration applied to the stator coils.

Other effects that may be obtained or are predicted by an exemplary embodiment will be explicitly or implicitly described in a detailed description of the present disclosure. That is, various effects that are predicted according to an exemplary embodiment will be described in the following detailed description.

BRIEF DESCRIPTION OF THE DRAWINGS

The drawings are intended to be used as references for describing the exemplary embodiments of the present disclosure, and the accompanying drawings should not be construed as limiting the technical spirit of the present disclosure.

DETAILED DESCRIPTION

Figure 1:
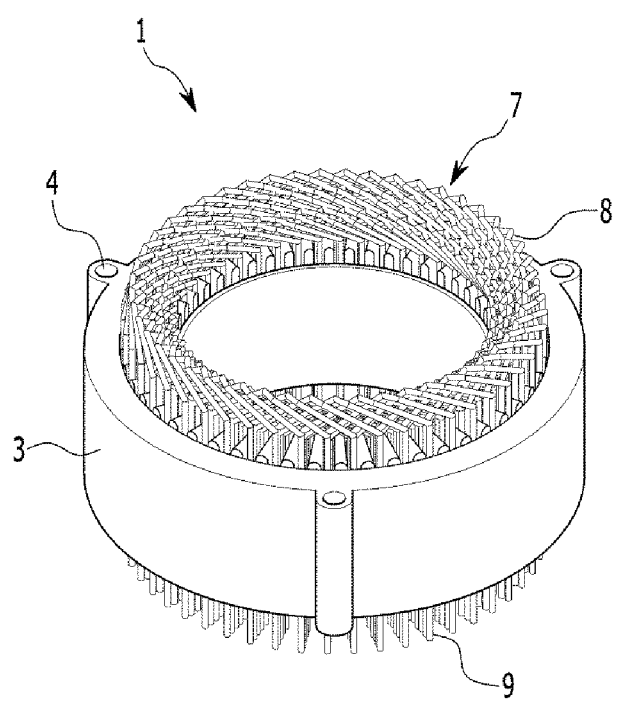
FIG. 1 illustrates an example of a hairpin winding type stator applicable to an exemplary embodiment of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

In order to clarify the present disclosure, parts that are not related to the description will be omitted, and the same elements or equivalents are referred to with the same reference numerals throughout the specification.

Also, the size and thickness of each element are arbitrarily shown in the drawings, but the present disclosure is not necessarily limited thereto, and in the drawings, the thickness of layers, films, panels, regions, etc., are exaggerated for clarity.

In addition, in the following description, dividing names of components into first, second, and the like is to divide the names because the names of the components are the same as each other and an order thereof is not particularly limited, In addition, unless explicitly described to the contrary, the word "comprise" and variations such as "comprises" or "comprising", will be understood to imply the inclusion of stated elements but not the exclusion of any other elements.

Furthermore, each of terms, such as " . . . unit", " . . . means", " . . . part", and " . . . member" described in the specification, mean a unit of a comprehensive element that performs at least one function or operation.

FIG. 1 illustrates an example of a hairpin winding type stator applicable to an exemplary embodiment of the present disclosure.

Referring to FIG. 1, a hairpin winding type stator 1 applied to an exemplary embodiment may be applied to a drive motor for a hybrid vehicle and/or electric vehicle as an environment-friendly vehicle that obtains driving torque from electrical energy. The drive motor includes the stator 1 applied to an exemplary embodiment and a rotor (not shown) disposed with a predetermined air gap from the stator 1.

The stator 1 includes a stator core 3 in which a number of electrical steel sheets are stacked. The stator core 3 has an exterior circumference surface and an interior circumference surface, and forms a plurality of slots that are formed in a radial direction and arranged circumferentially. Hairpin type stator coils 7 (which are commonly referred to as a conductor, a segment coil, or a flat coil, in the industry) are wound in the slots.

For example, the stator coils 7 are provided as a V-shaped hairpin type having a pair of legs, and may be provided as a flat coil having a rectangular cross-section. Furthermore, the stator coils 7 may be provided as a U-shaped or I-shaped hairpin type having a rectangular cross-section.

Such hairpin type stator coils 7 are inserted into the slots of the stator core 3, and legs of the stator coils 7 protrude through lower ends of the slots. The legs protruding through the lower ends of the slots may be welded together to form an electrical circuit.

Furthermore, bolt engagement holes 4 are formed on an exterior circumference surface of the stator core 3 at a predetermined interval along the exterior circumference direction.

In the above disclosure, an exemplary embodiment has been described to be applied to a hairpin winding type stator in a drive motor employed in a environment-friendly vehicle, however, the scope of the present disclosure is not limited thereto. It may be understood that the spirit of the present disclosure may be applied to a drive motor of various types and uses.

Meanwhile, while manufacturing the drive motor, an apparatus 100 for impregnating varnish into hairpin winding type stator according to an exemplary embodiment may be applied, for example, to a process for manufacturing the stator 1 of the hairpin winding type.

Furthermore, an apparatus 100 for impregnating varnish into hairpin winding type stator according to an exemplary embodiment may be applied to a process of impregnating insulation varnish into the stator coils 7 after an inserting process, a twisting process, a cutting process, a welding process, and an epoxy coating process of a welding portion of the stator coils 7.

In the varnish impregnation process, the varnish is impregnated into the stator coils 7 wound around the stator core 3, to reinforce mechanical strength of the stator coils 7, protect the stator coils 7 from vibration, and prevent air, moisture, and/or foreign materials from inflowing between the stator coils 7.

Here, an upper portion formed by upward protrusion of the stator coils 7 of the stator core 3 may be called a crown portion 8. In addition, a lower portion formed by downward protrusion of the stator coils 7 of the stator core 3 may be called a welding portion 9, and the welding portion 9 may be coated with epoxy.

Hereinafter, with reference to a mounting position of the elements (with reference to the drawings), a portion facing upward is called an upper portion, an upper end, an upper surface, and an upper end portion, a portion facing downward is called a lower part, a lower end, a lower surface, and a lower end portion.

In addition, hereinafter, an "end (one end, another end, and the like)" may be defined as any one end or may be defined as a portion (one end portion, another end portion, and the like) including that end.

The apparatus 100 for impregnating varnish into hairpin winding type stator according to an exemplary embodiment is structured such that the varnish may be impregnated into the stator coils 7 through simple scheme after the epoxy coating process, and durability of the epoxy coated on the welding portion 9 may be secured.

Figure 2:
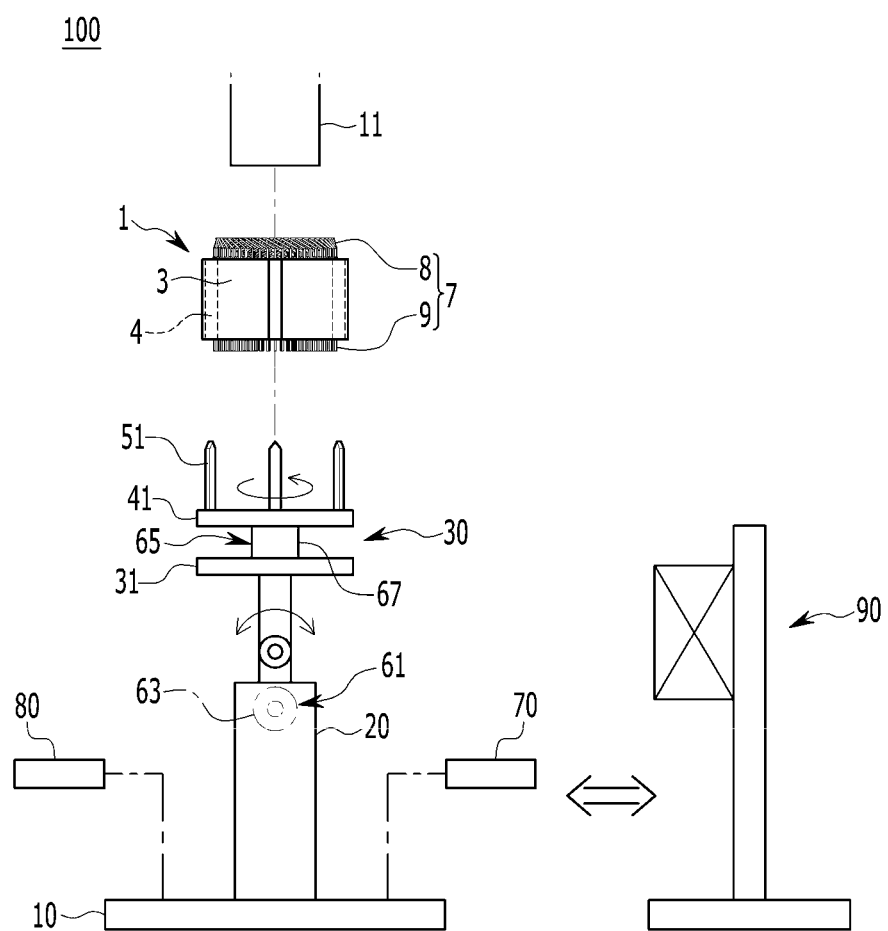
FIG. 2 schematically illustrates an apparatus for impregnating varnish into hairpin winding type stator according to an exemplary embodiment.

FIG. 2 schematically illustrates an apparatus for impregnating varnish into hairpin winding type stator according to an exemplary embodiment.

Referring to FIG. 1 and FIG. 2, an apparatus 100 for impregnating varnish into hairpin winding type the stator according to an exemplary embodiment includes a base frame 10, a supporting frame 20, a core mounting unit 30, a first varnish application unit 70, a second varnish application unit 80, and a varnish gelling unit 90.

The base frame 10 is for installing various constituent elements, which will be described further below, and is installed at a bottom of the process work area. The base frame 10 may be formed as a single frame or two or more sub-frames connected to each other.

The base frame 10 may include various accessory elements such as brackets, bars, rods, plates, blocks, ribs, collars, etc. to support various constituent elements.

However, since such accessory elements are for installing respective constituent elements to be described further below to the base frame 10, such accessory elements are collectively referred to as the base frame 10 except for exceptional cases.

The supporting frame 20 is vertically installed on the base frame 10. Specifically, the supporting frame 20 is fixedly installed to an upper surface of the base frame 10 through a lower end of the supporting frame 20.

In an exemplary embodiment, the core mounting unit 30 is configured to fixedly hold the stator core 3 transported by a handling robot 11 to the upper end side of the supporting frame 20 while gripping the stator core 3 by an arm of a handling robot 11.

Furthermore, the core mounting unit 30 may tilt the stator core 3 and may rotate the stator core 3 along a circumferential direction, with reference to the supporting frame 20.

The core mounting unit 30 is installed in an upper end portion of the supporting frame 20, and includes a tilting bracket 31, a rotary bracket 41, and a plurality of core chucking members 51.

The tilting bracket 31 is installed on the upper end portion of the supporting frame 20 to be capable of tilting by a first driving portion 61. The first driving portion 61 is installed on the supporting frame 20 and is configured to tilt the tilting bracket 31 by operating a first servo-motor 63.

Here, the first servo-motor 63 is a motor that may be servo-controlled in a rotation speed and a rotating direction. The first servo-motor 63 is installed on the supporting frame 20, and may be connected to the tilting bracket 31 through a speed reducer, which is known in the art and not illustrated in the drawings.

Furthermore, the tilting bracket 31 is provided to be capable of tilting in a range of 0 to 90 degrees together with the rotary bracket 41 with reference to the supporting frame 20 by the first driving portion 61.

The rotary bracket 41 is installed on the tilting bracket 31 to be rotatable along the circumferential direction by a second driving portion 65. The second driving portion 65 is installed on the tilting bracket 31, and is configured to rotate the rotary bracket 41 along the circumferential direction by a second servo-motor 67.

The second servo-motor 67 is a motor that may be servo-controlled in a rotation speed and a rotating direction. The second servo-motor 67 is installed on the tilting bracket 31, and may be connected to the rotary bracket 41 through a speed reducer, which is known in the art and not illustrated in the drawings.

In addition, the core chucking members 51 are configured to fix the stator core 3 to the rotary bracket 41. The core chucking members 51 are installed on the rotary bracket 41, and are coupled with, specifically inserted into a plurality of the bolt engagement holes 4 provided in the stator core 3.

Here, the core chucking members 51 may be coupled with, by being inserted into, the bolt engagement holes 4 of the stator core 3 by the handling robot 11, while the stator core 3 is gripped by the arm of the handling robot 11.

Figure 3:
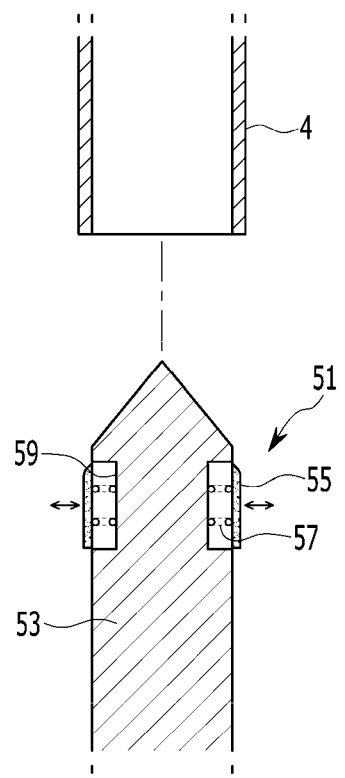
FIG. 3 illustrates a core chucking member applied to an apparatus for impregnating varnish into hairpin winding type stator according to an exemplary embodiment.

As shown in FIG. 3, the core chucking members 51 includes a chucking rod 53 and non-slip pads 55.

The chucking rod 53 is for chucking and fixing the stator core 3. A first end portion of each chucking rod 53 is fixed on the rotary bracket 41, and a second end portion of each chucking rod 53 is inserted into the bolt engagement hole 4 of the stator core 3.

The non-slip pad 55 is to apply a frictional force to the interior circumference surface of the bolt engagement hole 4 such that the chucking rod 53 does not easily come out of the bolt engagement hole 4 of the stator core 3.

The non-slip pad 55 is installed in the second end portion of the chucking rod 53 elastically by a spring 57. Here, when the cross-section of the chucking rod 53 is circular, the non-slip pad 55 may be disposed at a predetermined interval along the circumference direction on the exterior circumference surface of the chucking rod 53.

Furthermore, the non-slip pad 55 is installed in a mounting recess 59 formed on the exterior circumference surface of the chucking rod 53, elastically by the spring 57, where the spring 57 is fixed to an interior wall of the mounting recess 59 and is connected to the non-slip pad 55.

The non-slip pad 55 normally protrudes from the exterior circumference surface of the chucking rod 53 by the elasticity of the spring 57. In addition, when is coupled with the bolt engagement hole 4 of the stator core 3, the non-slip pad 55 compresses the spring 57 and is immersed in the mounting recess 59 of the chucking rod 53.

Referring to FIG. 1 and FIG. 2, in an exemplary embodiment, the first varnish application unit 70 is configured to apply the varnish to interior and exterior sides of the crown portion 8 of the stator coils 7 of the stator core 3 fixedly held to the core mounting unit 30.

The first varnish application unit 70 is movably installed on the base frame 10, correspondingly to the stator core 3 fixed to the core chucking members 51 of the core mounting unit 30.

Figure 4:
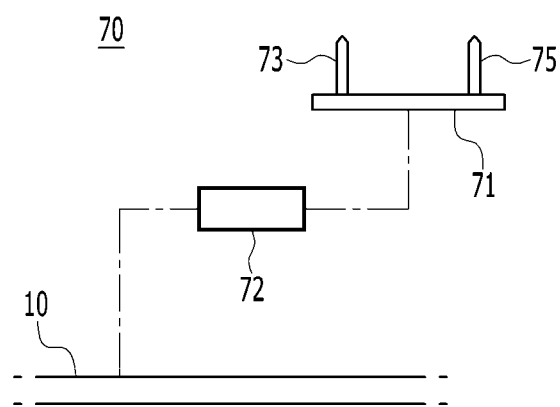
FIG. 4 illustrates a first varnish application unit applied to an apparatus for impregnating varnish into hairpin winding type stator according to an exemplary embodiment.

As shown in FIG. 4, the first varnish application unit 70 includes a first movable member 71, a first application nozzle 73, and a second application nozzle 75.

The first movable member 71 is movably installed on the base frame 10 through a third driving portion 72. Here, the third driving portion 72 may have an operation rod that operates backward and forward, for example, in a pneumatical manner, and may include a pneumatic cylinder of a known technology that is connected to the first movable member 71 through the operation rod. Furthermore, the third driving portion 72 may include a multi-axis robot.

The first application nozzle 73 is configured to apply the varnish toward the interior of the crown portion 8 of the stator coils 7. The first application nozzle 73 is installed on the first movable member 71, and connected to varnish supply portion (not shown) that stores and supplies the varnish.

In addition, the second application nozzle 75 is configured to apply the varnish toward the exterior of the crown portion 8 of the stator coils 7. The second application nozzle 75 is installed on the first movable member 71, and connected to varnish supply portion (not shown) that stores and supplies the varnish.

Referring to FIG. 1 and FIG. 2, in an exemplary embodiment, the second varnish application unit 80 is configured to the apply the varnish to interior and exterior sides of the welding portion 9 of the stator coils 7 of the stator core 3 fixedly held to the core mounting unit 30.

The second varnish application unit 80 is movably installed on the base frame 10, correspondingly to the stator core 3 fixed to the core chucking members 51 of the core mounting unit 30.

Figure 5:
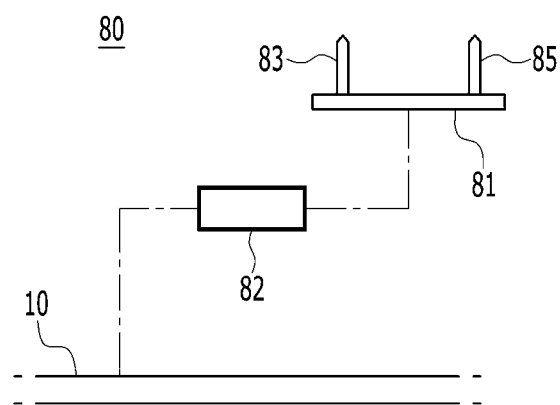
FIG. 5 illustrates a second varnish application unit applied to an apparatus for impregnating varnish into hairpin winding type stator according to an exemplary embodiment.

As shown in FIG. 5, the second varnish application unit 80 includes a second movable member 81, a third application nozzle 83, and a fourth application nozzle 85.

The second movable member 81 is movably installed on the base frame 10 through a fourth driving portion 82. Here, the fourth driving portion 82 may have an operation rod that operates backward and forward, for example, in a pneumatical manner, and may include a pneumatic cylinder of a known technology that is connected to the second movable member 81 through the operation rod. Furthermore, the fourth driving portion 82 may include a multi-axis robot.

The third application nozzle 83 is configured to apply the varnish toward the interior of the welding portion 9 of the stator coils 7. The third application nozzle 83 is installed on the second movable member 81, and connected to varnish supply portion (not shown) that stores and supplies the varnish.

In addition, the fourth application nozzle 85 is configured to apply the varnish toward the exterior of the welding portion 9 of the stator coils 7. The fourth application nozzle 85 is installed on the second movable member 81, and is connected to a varnish supply portion (not shown).

Referring to FIG. 1 and FIG. 2, in an exemplary embodiment, the varnish gelling unit 90 is configured to heat the varnish coated on the stator coils 7 by the first varnish application unit 70 and the second varnish application unit 80. Here, the varnish gelling unit 90 may heat the varnish coated on the stator coils 7 to a range of 150° C. to 200° C. thereby gelling the varnish.

Figure 6:
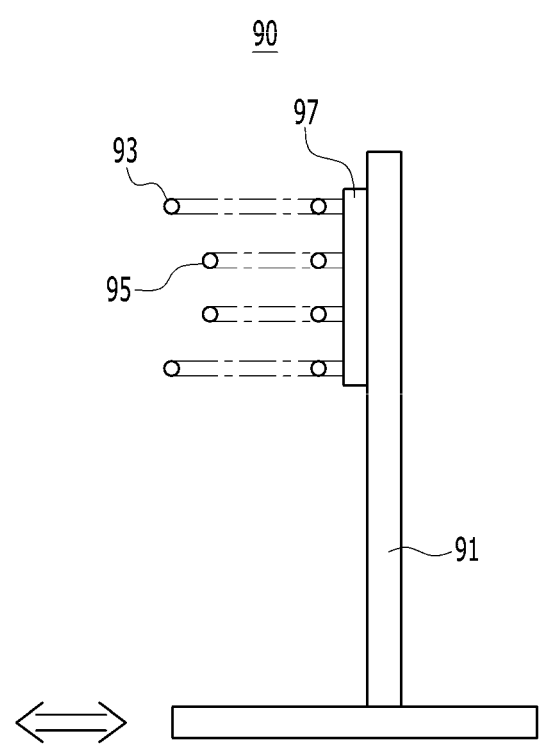
FIG. 6 illustrates a varnish gelling unit applied to an apparatus for impregnating varnish into hairpin winding type stator according to an exemplary embodiment.

The varnish gelling unit 90 is installed to be reciprocally moved to the base frame 10 correspondingly to the supporting frame 20. As shown in FIG. 6, the varnish gelling unit 90 includes a movable frame 91, a first induction coil 93, and a second induction coil 95.

The movable frame 91 is moveably installed on the base frame 10 through a driving portion such as a pneumatic cylinder or a servo-motor, which is known in the art.

The first induction coil 93 is configured to surround exterior circumference of the stator core 3 and to induction-heat the exterior circumference of the stator core 3 and the exterior of the stator coils 7. That is, the first induction coil 93 is disposed apart from the exterior circumference of the stator core 3, and may perform induction heating of the exterior circumference of the stator core 3 and the exterior of the stator coils 7. The first induction coil 93 is fixedly installed to the movable frame 91.

In addition, the second induction coil 95 is configured to surround interior circumference of the stator core 3 and to induction-heat the interior circumference of the stator core 3 and the interior of the stator coils 7. That is, the second induction coil 95 is disposed apart from the interior circumference of the stator core 3, and may perform induction heating of the interior circumference of the stator core 3 and the interior of the stator coils 7. The second induction coil 95 is fixedly installed to the movable frame 91.

Here, induction heating is to heat a metal object using the principle of electromagnetic induction of high frequency current. When the current is applied, the first induction coil 93 and the second induction coil 95 generate vortex current in the heating portion of the induction heating object to be heated, and may heat the heating portion as Joule heating generated by the resistance of the metal.

In addition, the first induction coil 93 and the second induction coil 95 may be formed in a hollow pipe shape, for example, a copper pipe made of copper material may be applied. Furthermore, the first induction coil 93 and the second induction coil 95 may be fixedly installed on the movable frame 91 through a mounting bracket 97 of an insulating material.

Hereinafter, an operation of an apparatus for impregnating varnish into hairpin winding type stator according to an exemplary embodiment is described in detail with reference to the accompanying drawings.

FIG. 7 to FIG. 10 respectively illustrate operation of an apparatus for impregnating varnish into hairpin winding type stator according to an exemplary embodiment.

Figure 7:
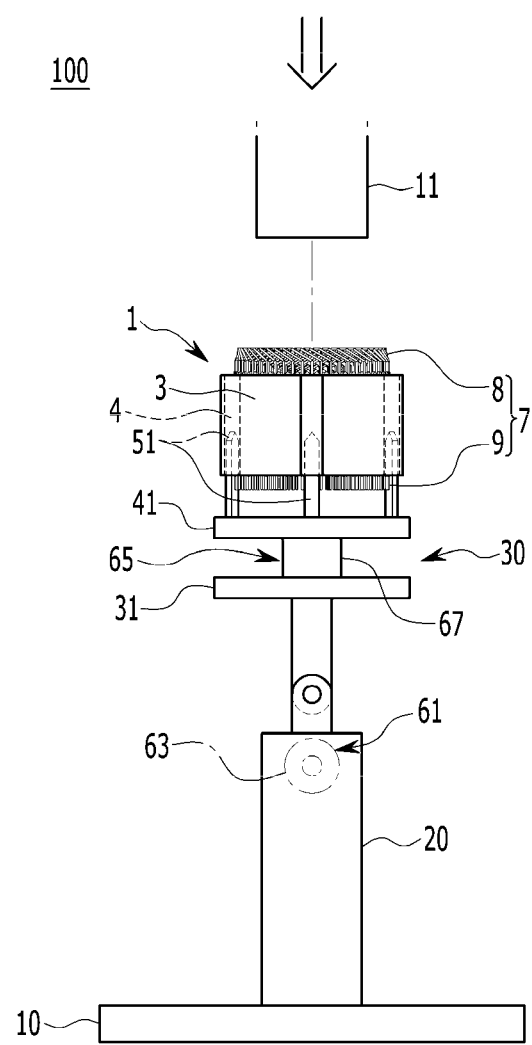
FIG. 7 illustrates operation of an apparatus for impregnating varnish into hairpin winding type stator according to an exemplary embodiment.

Referring to FIG. 7, in an exemplary embodiment, the tilting bracket 31 together with the rotary bracket 41 is oriented upward along the supporting frame 20. At this time, the core chucking members 51 on the rotary bracket 41 are also pointing upward.

In such a state, in an exemplary embodiment, the stator core 3 is gripped by the arm of the handling robot 11, and the stator core 3 is moved toward the core chucking members 51 by the handling robot 11.

At this time, the non-slip pad 55 of the core chucking members 51 radially protrude from the exterior circumference surface of the chucking rod 53 by the elasticity of the spring 57.

Then, in an exemplary embodiment, the stator core 3 is moved in downward direction by the handling robot 11, and the chucking rod 53 of the core chucking members 51 is coupled with the bolt engagement holes 4 of the stator core 3. After this, in an exemplary embodiment, the gripping of the stator core 3 by the handling robot 11 is released.

Here, when the chucking rod 53 of the core chucking members 51 are coupled with the bolt engagement holes 4 of the stator core 3, the non-slip pad 55 compresses the spring 57, and while being immersed into the mounting recess 59 of the chucking rod 53, applies a frictional force caused by the elastic force of the spring 57 to the interior circumference surface of the bolt engagement hole 4. Accordingly, the stator core 3 may be firmly fixed to the core chucking members 51.

Figure 8:
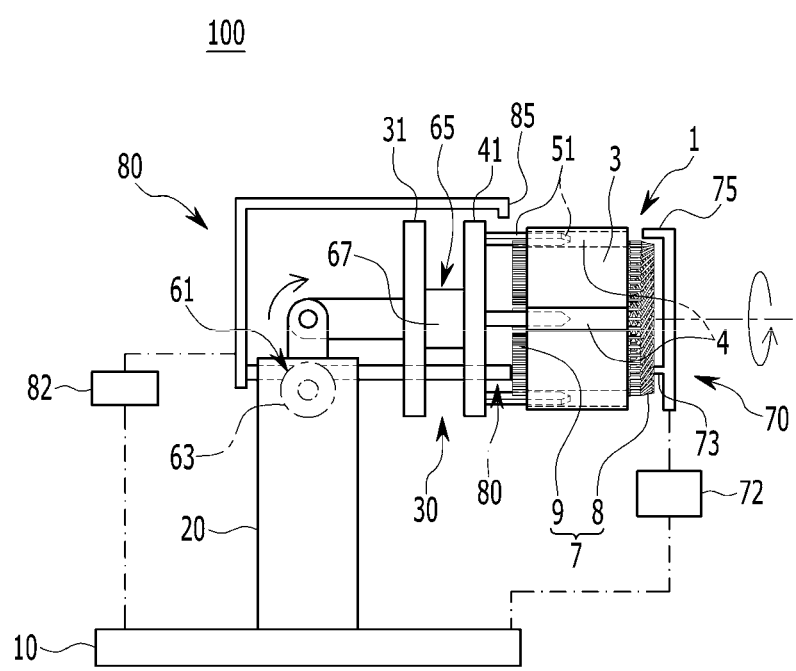
FIG. 8 illustrates operation of an apparatus for impregnating varnish into hairpin winding type stator according to an exemplary embodiment.

In such a state, in an exemplary embodiment, as shown in FIG. 8, the tilting bracket 31 together with the rotary bracket 41 is tilted by 90 degrees by the operation of the first driving portion 61.

As the tilting bracket 31 together with the rotary bracket 41 is tilted by 90 degrees, the stator core 3 is horizontally disposed while being fixed to the core chucking members 51.

Subsequently, in an exemplary embodiment, by the operation of the third driving portion 72, the first application nozzle 73 and the second application nozzle 75 are moved toward a first side of the stator core 3 by the first movable member 71 of the first varnish application unit 70, specifically, toward the crown portion 8 of the stator coils 7.

Simultaneously, in an exemplary embodiment, by the operation of the fourth driving portion 82, the third application nozzle 83 and the fourth application nozzle 85 are moved toward a second side of the stator core 3 by the second movable member 81 of the second varnish application unit 80, specifically, toward the welding portion 9 of the stator coils 7.

Here, the first application nozzle 73 is positioned in the interior side the crown portion 8 of the stator coils 7, the second application nozzle 75 is positioned in the exterior side of the exterior of the crown portion 8. In addition, the third application nozzle 83 is positioned in the interior side of the welding portion 9, and the fourth application nozzle 85 is positioned in the exterior side of the welding portion 9.

It may be understood that the specific positions and directions of the first application nozzle 73, the second application nozzle 75, the third application nozzle 83, and the fourth application nozzle 85 are not limited as illustrated in the drawings.

Subsequently, in an exemplary embodiment, by the operation of the second driving portion 65, the rotary bracket 41 is rotated along the circumferential direction of the stator core 3. Then, the stator core 3 is rotated by the rotary bracket 41 while being fixedly held by the core chucking members 51.

In an exemplary embodiment, the varnish supplied from the varnish supply portion (not shown) is applied toward the interior side of the crown portion 8 of the stator coils 7 through the first application nozzle 73, and toward the exterior side of the crown portion 8 through the second application nozzle 75.

In addition, in an exemplary embodiment, the varnish supplied from the varnish supply portion (not shown) is applied toward the interior side of the welding portion 9 of the stator coils 7 through the third application nozzle 83, and toward the exterior of the welding portion 9 through the fourth application nozzle 85.

Figure 9:
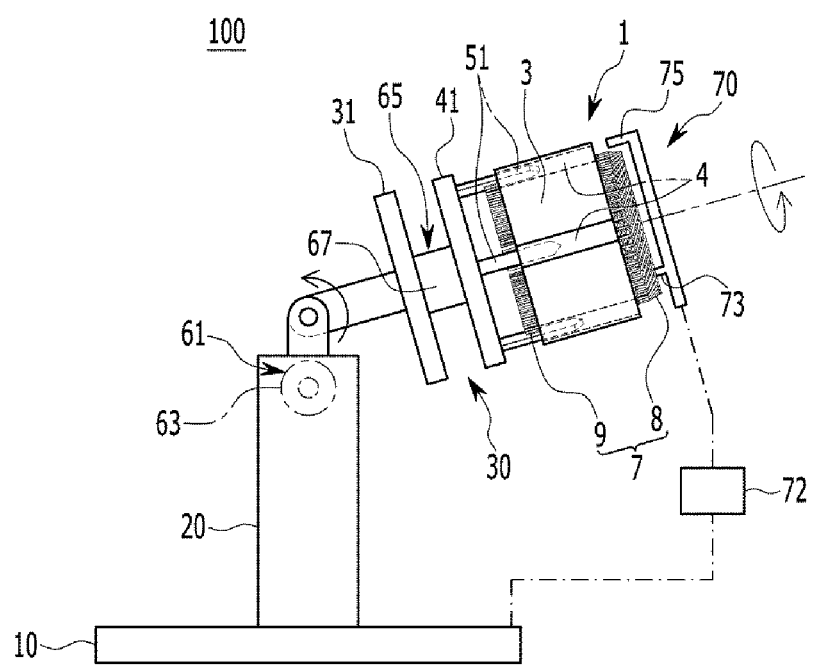
FIG. 9 illustrates operation of an apparatus for impregnating varnish into hairpin winding type stator according to an exemplary embodiment.

Meanwhile, in an exemplary embodiment, as shown in FIG. 9, by the operation of the first driving portion 61, the tilting bracket 31 together with the rotary bracket 41 that has been tilted by the 90 degrees angle to be horizontally aligned may be tilted to another angle (for example, upward in the drawing) by a predetermined angle (e.g., 30 degrees). Then, with reference to the supporting frame 20, the stator core 3 is disposed to be inclined downward from the crown portion 8 of the stator coils 7 toward the welding portion 9.

Here, the third application nozzle 83 and the fourth application nozzle 85 of the second varnish application unit 80 are in a shifted direction away from the stator core 3, by the operation of the fourth driving portion 82. In addition, the first application nozzle 73 and the second application nozzle 75 of the first varnish application unit 70 moves along the tilting direction of the stator core 3 by the operation of the third driving portion 72, and are positioned at the interior side and exterior side of the crown portion 8.

Furthermore, the stator core 3 is rotating by the operation of the second driving portion 65, the first application nozzle 73 and the second application nozzle 75 apply the varnish to interior and exterior sides of the crown portion 8.

Therefore, in an exemplary embodiment, while the stator core 3 is inclined downward and the stator core 3 is being rotated, as the varnish is applied to the interior and exterior sides of the crown portion 8 through the first application nozzle 73 and the second application nozzle 75, varnish flows from the crown portion 8 toward the welding portion 9 such that the varnish may be applied to the entire portion of the stator coils 7.

Figure 10:
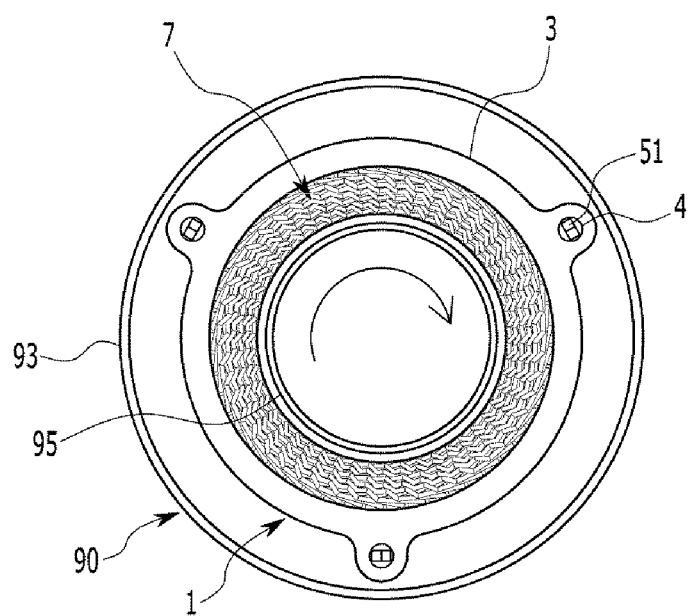
FIG. 10 illustrates operation of an apparatus for impregnating varnish into hairpin winding type stator according to an exemplary embodiment

Then, in an exemplary embodiment, as shown in FIG. 10, the tilting bracket 31 together with the rotary bracket 41 are tilted by the operation of the first driving portion 61 such that the stator core 3 is aligned in the horizontal direction. At this time, the first application nozzle 73 and the second application nozzle 75 of the first varnish application unit 70 are moved away from the stator core 3 by the operation of the third driving portion 72, and the rotation of the rotary bracket 41 is stopped.

In such a state, in an exemplary embodiment, the movable frame 91 of the varnish gelling unit 90 is moved toward the stator core 3.

Then, in an exemplary embodiment, the first induction coil 93 of the varnish gelling unit 90 may be disposed outwardly apart from the exterior circumference of the stator core 3, and the second induction coil 95 of the varnish gelling unit 90 may be disposed inwardly apart from the interior circumference of the stator core 3. That is, the first induction coil 93 is configured to surround the exterior circumference of the stator core 3, and the second induction coil 95 is configured to surround the interior circumference of the stator core 3.

Subsequently, in an exemplary embodiment, the first induction coil 93 and the second induction coil 95 is supplied with power while the stator core 3 is being rotated by the rotary bracket 41 by the operation of the second driving portion 65.

Then, in an exemplary embodiment, varnish coated on the stator coils 7 may be heated by induction heating to the range of 150° C. to 200° C. through the first induction coil 93 and the second induction coil 95, thereby gelling the varnish.

In an exemplary embodiment, since the first induction coil 93 and the second induction coil 95 are moved near the exterior circumference and the interior circumference of the stator core 3, respectively, and then the varnish coated on the stator coils 7 is heated by induction heating, the varnish may be quickly gelled.

According to an apparatus 100 for impregnating varnish into hairpin winding type stator according to an exemplary embodiment, the varnish may be applied to and impregnated into the stator coils 7 of the stator core 3 that is tilted and rotated, by the first varnish application unit 70 and the second varnish application unit 80.

In addition, in an exemplary embodiment, the first induction coil 93 and the second induction coil 95 of the varnish gelling unit 90 is placed toward the interior circumference and the exterior circumference of the stator core 3, and the stator coils 7 are induction-heated by the first induction coil 93 and the second induction coil 95, thereby gelling the varnish impregnated into the stator coils 7.

Therefore, in an exemplary embodiment, the varnish may be impregnated into the stator coils 7 and gelled by configuration to secure durability of epoxy coated on the welding portion 9 of the stator coils 7.

Therefore, in an exemplary embodiment, it is possible to prevent defects such as the peeling of the epoxy from the welding portion 9 of the stator coils 7 where the mechanical strength is weak, due to external force and vibration applied to the stator coils 7.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

The invention claimed is:

1. An apparatus for impregnating varnish into stator coils of a hairpin winding type stator after coating epoxy resin on a welding portion of hairpin type stator coils wound around stator core, the apparatus comprising:
    a supporting frame vertically installed on a base frame;
    a tilting bracket installed on an upper end portion of the supporting frame to be capable of tilting;
    a rotary bracket installed on the tilting bracket to be rotatable along a circumferential direction;
    core chucking members installed on the rotary bracket, inserted into a plurality of bolt engagement hole provided in the stator core, and fixing the stator core to the rotary bracket;
    a first varnish application unit movably installed on the base frame, and configured to apply the varnish to interior and exterior sides of a crown portion of the stator coils; and
    a second varnish application unit movably installed on the base frame, and configured to apply the varnish to interior and exterior sides of the welding portion of the stator coils.

2. The apparatus of claim 1, further comprising a varnish gelling unit installed to be reciprocally movable on the base frame, and configured to heat the varnish coated on the stator coils by the first and second varnish application units.

3. The apparatus of claim 1, further comprising:
    a first driving portion installed on the supporting frame, and configured to tilt the tilting bracket by an operation of a first servo-motor; and
    a second driving portion installed on the tilting bracket, and configured to rotate the rotary bracket along the circumferential direction by an operation of a second servo-motor.

4. The apparatus of claim 3, wherein the tilting bracket is provided to be capable of tilting together with the rotary bracket in a range of 0 to 90 degrees with reference to the supporting frame by the first driving portion.

5. The apparatus of claim 1, wherein the core chucking members is inserted into the bolt engagement holes by a handling robot while the stator core is gripped by an arm of the handling robot.

6. The apparatus of claim 1, wherein the core chucking member comprises:
    a chucking rod having a first end fixed to the rotary bracket, and a second end portion to be inserted into the bolt engagement hole of the stator; and
    a plurality of non-slip pads each installed in the second end portion of the chucking rod elastically by a spring.

7. The apparatus of claim 1, wherein the first varnish application unit comprises:
    a first movable member provided to be movably by a third driving portion;
    a first application nozzle installed on the first movable member, and configured to apply the varnish toward the interior of the crown portion; and
    a second application nozzle installed on the first movable member, and configured to apply the varnish toward the exterior of the crown portion.

8. The apparatus of claim 7, wherein the second varnish application unit comprises:
    a second movable member provided to be movably by a fourth driving portion;
    a third application nozzle installed on the second movable member, and configured to apply the varnish toward the interior of the welding portion; and
    a fourth application nozzle installed on the second movable member, and configured to apply the varnish toward the exterior of the welding portion.

* * * * *